United States Patent [19]

Geirnaert

[11] 4,202,251

[45] May 13, 1980

[54] GENERATOR FOR FLOW RATE OF PRESSURIZED FLUID

[75] Inventor: Marcel Geirnaert, Ternat-Wambeek, Belgium

[73] Assignee: S.E.C.A. Société Anonyme Société d'Entreprises Commerciales et Aéronautiques, Belgium

[21] Appl. No.: 904,374

[22] Filed: May 10, 1978

[30] Foreign Application Priority Data

May 12, 1977 [BE] Belgium .............................. 177519
May 9, 1978 [BE] Belgium ............................ 1187507

[51] Int. Cl.² .......................................... F01B 13/04
[52] U.S. Cl. .................................... 91/472; 91/480; 91/499; 417/513; 60/413
[58] Field of Search .............. 417/513, 511, 441; 91/472, 474, 477, 480, 499, 501; 60/413, 418

[56] References Cited

U.S. PATENT DOCUMENTS

| | | | |
|---|---|---|---|
| 1,538,911 | 5/1925 | Taylor | 417/513 X |
| 2,623,358 | 12/1952 | Greer | 60/418 X |
| 2,752,754 | 7/1956 | Jaseph | 60/418 |
| 2,759,333 | 8/1956 | Atchison | 417/441 X |
| 3,468,263 | 9/1969 | Niemiec | 91/499 |
| 4,108,049 | 8/1978 | Lawson | 91/478 |

FOREIGN PATENT DOCUMENTS

18918 of 1913 United Kingdom ..................... 417/441

*Primary Examiner*—Edgar W. Geoghegan
*Attorney, Agent, or Firm*—Hill, Van Santen, Steadman, Chiara & Simpson

[57] ABSTRACT

A power generator comprising: body means having three chambers separated from each other by fixed fluid-tight partitions and having a central bore. Shaft means are rotatably mounted in the central bore of the body means with at least one end of the shaft means extending from the body means. At least two drive cylinders are mounted in the central one of the chambers in the body means, each of the drive cylinders include two pistons which are slidably mounted in opposition with each piston having two opposite working faces. The piston rods are attached to the corresponding ones of the pistons traversing a respective of the partitions through stationary fluid-tight joints for allowing the piston rods to move therethrough on a pure translational movement. Two swash plate means are provided. Each of the swash plate means includes a respective lateral one of the chambers. Each swash plate means is attached to the shaft means and has means for mechanical attachment of the piston rods from the corresponding pistons in the drive cylinders.

5 Claims, 10 Drawing Figures

GENERATOR FOR FLOW RATE OF PRESSURIZED FLUID

FIELD OF THE INVENTION

The present invention concerns a power generator having a high performance and extremely low power/weight ratio. This generator is capable of forming the basic unit for various types of engines, thereby advantageously replacing the conventional heat engines.

In order to understand more readily the disadvantages of conventional heat engines, their application in the production of a rotational couple or torque at various speeds will in particular be considered. In this application it is known that the reciprocating rectilinear movement of the pistons is converted into rotational movement by a crankshaft to which are connected the connecting rods driven by the said pistons. In these engines the motive or drive couple is varied by altering the combustion conditions and by means of various mechanisms, in particular gears.

The crankshaft coupling causes a substantial loss in mechanical efficiency since a blind angle is produced throughout the length of the rotational path of the crankshaft and may in certain cases be as high as approximately 45°, thereby producing a poor utilisation of the energy liberated by the combustion. The mechanical transmission beyond the crankshaft causes a further loss in mechanical efficiency, which may well be substantial.

Another result of the crankshaft coupling is that its rotation produces lateral mechanical forces on the pistons that give rise to cylinder wear on the one hand and piston-slap or noise on the other hand and when the compression ratio becomes high.

Furthermore, control of changes in operation (changes in speed and reversal of the direction of movement) requires complicated, expensive and cumbersome gear mechanisms which may even be more cumbersome and heavier than the engine itself.

The invention aims to obviate these disadvantages and to provide, according to the needs, compact engines or advantageously decentralised engines in which the traditional cumbersome mechanical coupling devices, which are the cause of large mechanical losses, are eliminated.

The object of the invention is more especially a translational movement power generator capable of regulating the operating conditions directly in a flexible and smooth manner, irrespective of the haulage unit or working unit.

The object of the invention is also such a generator having high performance and reduced dimensions.

One particularly valuable aspect of this generator is that it enables drive functions to be carried out under favourable conditions of space and decentralisation with such a favourable power/weight ratio that, even in the case of Diesel engines, it can advantageously compete with conventional petrol engines.

Of the remarkable advantages that can be obtained with the generator according to the invention, there may in particular be mentioned the very low noise level, the very low vibration level, the elimination of problems of cylinder wear, the elimination of power losses due to the conventional coupling and tranmission mechanisms, and the considerable reduction in the constraints inherent in the use of conventional power transmission units.

The object of the invention is moreover a compact engine in which the mechanical and thermal parts are separated so as to simplify considerably the problems of lubrication and increase the mechanical reliability of the system up to the levels normally reserved for high powered engines.

In addition, by virtue of the minimal mechanical losses the generator according to the invention guarantees a considerable fuel economy and, on account of the separation of the mechanical and thermal parts, it can operate at higher temperatures and thereby ensures a more complete combustion in the combustion chamber, and is thereby less polluting than conventional engines.

SUMMARY OF THE INVENTION

The generator according to the invention comprises a drive motor comprising at least one active member designed to execute a reciprocating translational movement when in operation, at least one high pressure pump comprising an active member coupled to the active member of the drive motor so as to be able to execute a reciprocating translational movement, the said pump having an inlet for receiving a determined flow of fluid and an outlet provided with a valve, the active member of said pump being adapted to compress the amount of fluid introduced into the pump with the power applied to this active member by the drive motor in such a way that the pressure of the fluid at the pump outlet varies oppositely to the variation in flow rate of fluid admitted to the pump for a determined feed of the drive motor.

A flow regulating device is connected to regulate the flow rate of the fluid accepted into the high pressure pump in order to regulate the operating and running conditions of a suitable working unit. This flow regulating device can in accordance with this invention, be comprised of a hydraulic reservoir having a preadjusted upper limit pressure, thereby to achieve an automatic adjustment to the variations of the operating and running conditions.

In accordance with a particularly advantageous embodiment of the invention each active member of the drive motor is coupled by kinetically rigid connection to the active member of a high pressure pump, thus providing a rigid in-line assembly which ensures a remarkably low noise level and vibration level while being of very simple construction.

DESCRIPTION OF EXEMPLARY EMBODIMENTS

Figure 1:
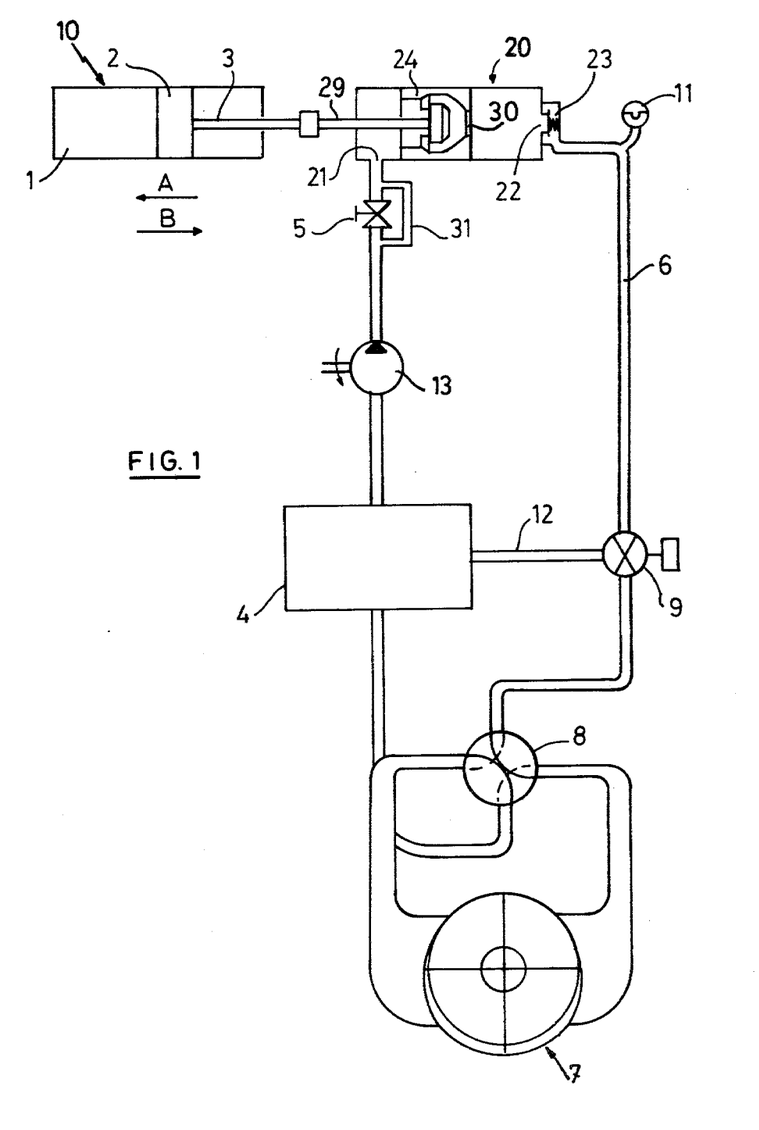
FIG. 1 shows diagrammatically the layout of an exemplary pressurized fluid assembly.

Referring to FIG. 1 there is shown a pressurized fluid assembly comprising a drive motor 10 and a high pressure pump 20 directly kinetically connected to one another. The drive motor is typically a piston represented diagrammatically by a cylinder 1 in which moves a reciprocating piston 2, and a suitable auxiliary device (not shown in the drawing, for the sake of clarity), ensuring the return of the piston 2. This piston drives the high pressure pump 20. The latter is represented by way of example by a single cylinder in which a piston 24 (described hereinafter with reference to FIG. 2) is mounted, and coupled directly to the piston 2 of the drive cylinder. The cylinder of the pump 20 comprises a fluid inlet orifice 21 and a fluid outlet orifice 22. The fluid inlet orifice 21 is connected to a fluid source (for example oil), shown by the reservoir 4, via a flow regulation valve 5. The fluid outlet orifice 22 is provided with a valve 23. The outlet pipe 6 supplies an arbitrary working unit with pressurised fluid, and the said working unit may be a rotary unit 7 as shown by way of example, and adapted to convert the power stored in the pressurised fluid into rotational couple or torque. The working unit may obviously also be a linear translation unit such as a jack operating a tool, for instance.

The valve 5 is designed so as to allow a residual flow to pass, symbolised by the by-pass 31 in FIG. 1. The object is to ensure that there is always sufficient lubrication. When the valve 5 thus allows a residual flow to pass, a valve 9 will ensure the return of the fluid to the revervoir 4. A forcing pump 13 ensures a steady uniform operation under idling conditions and a good filling at high operating speeds.

The reversal of the direction of movement of the working unit 7 is controlled by the action of a reversing valve 8. The disengagement of the working unit 7 is controlled by the electrically operated valve 9 which short-circuits the fluid directly to the reservoir 4 via the pipe 12.

Figure 2:
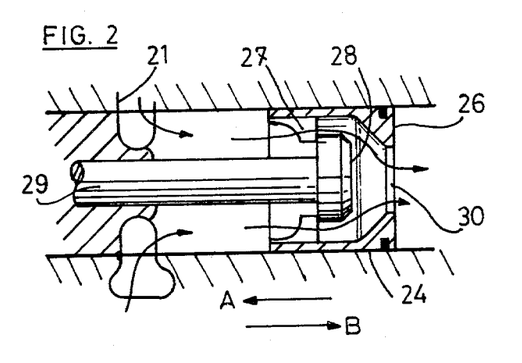
FIG. 2 a longitudinal section of one embodiment of the piston in the high pressure pump in FIG. 1.

FIG. 2 is a longitudinal section of one embodiment of the piston 24. The latter consists of a sleeve provided with lugs 26 and 27 between which is accommodated with mechanical clearance a head 28 secured to the end of the rod 29 so that the said head 28 can act as a valve during the reciprocatory displacement of the rod 29, as will be seen hereinafter.

In order to explain the operation of this device, it is assumed that the valve 5 in FIG. 1 is open and that the piston 24, driven by the rod 29 under the action of the piston 2, is displaced in the direction of the arrow A. The valve 23 is then closed. Fluid thus fills the cylinder through the opening 30 in the piston 24, which then disengages the head 28 as shown in FIG. 2. This fluid is introduced at a relatively low pressure by the forcing pump 13.

During the explosion or combustion and expansion phase in the cylinder 1, the piston 2 drives the rod 29 in the direction of the arrow B. The head 28 will then close the opening 30 of the piston 24 and drives the latter, with itself, in the direction of the arrow B. The piston 24 thus compresses the fluid occupying the volume of the cylinder upstream of the outlet valve 23, and the compressed fluid is driven through the valve 23 to the working unit 7. When all the compressed fluid has been driven through valve 23, the piston 24 is drawn back in the direction of the arrow A, thus allowing the feed fluid to fill all the free volume of the cylinder, as described above. The cycle then repeats in response to the reciprocating drive by the piston 2. A hydraulic reservoir 11, which is a device known per se, is provided at the outlet pipe of the pump 20 and acts to damp mechanical shocks.

In order to regulate the rotational velocity of the working unit 7, it is sufficient to regulate the fluid flow rate by means of the valve 5. When the latter is completely open, the flow rate as well as the rotational velocity of the working unit 7 are a maximum, whereas the pressure of the fluid and the rotational couple are a minimum. When the valve 5 is partially closed, the flow rate of fluid introduced into the pump cylinder 20 is reduced proportionally to the degree of closure of the valve. This fluid then occupies a reduced volume in the cylinder proportional to the reduction in the flow rate, and on account of this reduction in the volume occupied by the fluid, a vacuum is created in the pump cylinder 20. When the piston 24 is displaced in the direction of the arrow B, and for equal feed conditions, the piston is driven with the same energy, and during the first part of its movement the energy is stored inertially in the moving parts before the piston begins to drive back the fluid. When the piston reaches the fluid it drives the latter with a force derived from the energy stored during the first part of its movement and the residual energy from the expansion of the gases in the cylinder 1. The pressure of the fluid at the outlet 22 of the pump cylinder 20 is thus increased by this inertia effect, thereby enabling the drive or motive couple of the working unit 7 to be increased. The rotational velocity for its part, is reduced as a function of the increase in pressure. A flexible and precise regulation of the velocity and rotational couple is obtained with the arrangement according to the invention simply by regulating the flow rate of the fluid without the intervention of any transmission mechanism, and therefore without substantial mechanical losses.

Adjustment to variations in the couple and velocity imposed on the working unit 7 may also be effected automatically in accordance with this invention, in a very simple manner. The principle of a hydraulic circuit for this purpose is shown diagrammatically in FIG. 3. A device 31 similar to a hydraulic reservoir having a preadjustable upper limit pressure is connected to the outlet pipe 6 of the pump 20. This device 31 comprises a membrane 32 that is attracted as a function of the pressure difference acting on its two faces. In the embodiment illustrated by way of example, the counter-pressure is preadjusted by means of a screw 31A that tightens a second membrane 32A. To the fluid inlet pipe is connected a valve 33 subject to the operating state of the engine so as to permit starting of the generator. The valve 33 is preregulated in a partially closed position. When the generator reaches a normal operating state sufficient to withstand the pressure of the working unit 7, the opening of the valve 33 allows the device 31 to play its part as a variable transmission.

When the valve 33 is open, the pump cylinder 20 is completely filled with fluid, the flow rate of fluid being a maximum and its pressure being a minimum. The membrane 32 of the device 31 is then extended and adopts the position denoted by a in the drawing: the speed of the rotor 7 is then at a maximum and its rotational couple is at a minimum. When the membrane 32 of the device 31 is contracted the rotor velocity decreases and its couple increases, while the pressure of the fluid increases. The membrane 32 is then in its compressed position denoted by b in FIG. 3. Since the cavity of the device 31 has thus been enlarged, the closed circuit constituting the hydraulic system no longer contains sufficient fluid to fill the chamber of the cylinder pump 20 and the cylinder is thus only partially filled with fluid. Since the same energy is always applied to the piston 24 of the pump, the energy is stored by inertia in the moving parts and the pressure of the compressed fluid at the outlet 22 of the pump cylinder increases. The variations in the pressure of the fluid thus follow continuously and smoothly the variations in the speed of the working unit. It is the preregulated device 31 that, in the arrangement according to the invention, acts as an automatic couple and normal running variator that is completely subject to pressure variations while preserving the same power. A membrane reservoir 34 whose object is to neutralise any sudden changes in the pressure of the fluid during idling or overload conditions is connected upstream of the valve 33.

Figure 3:
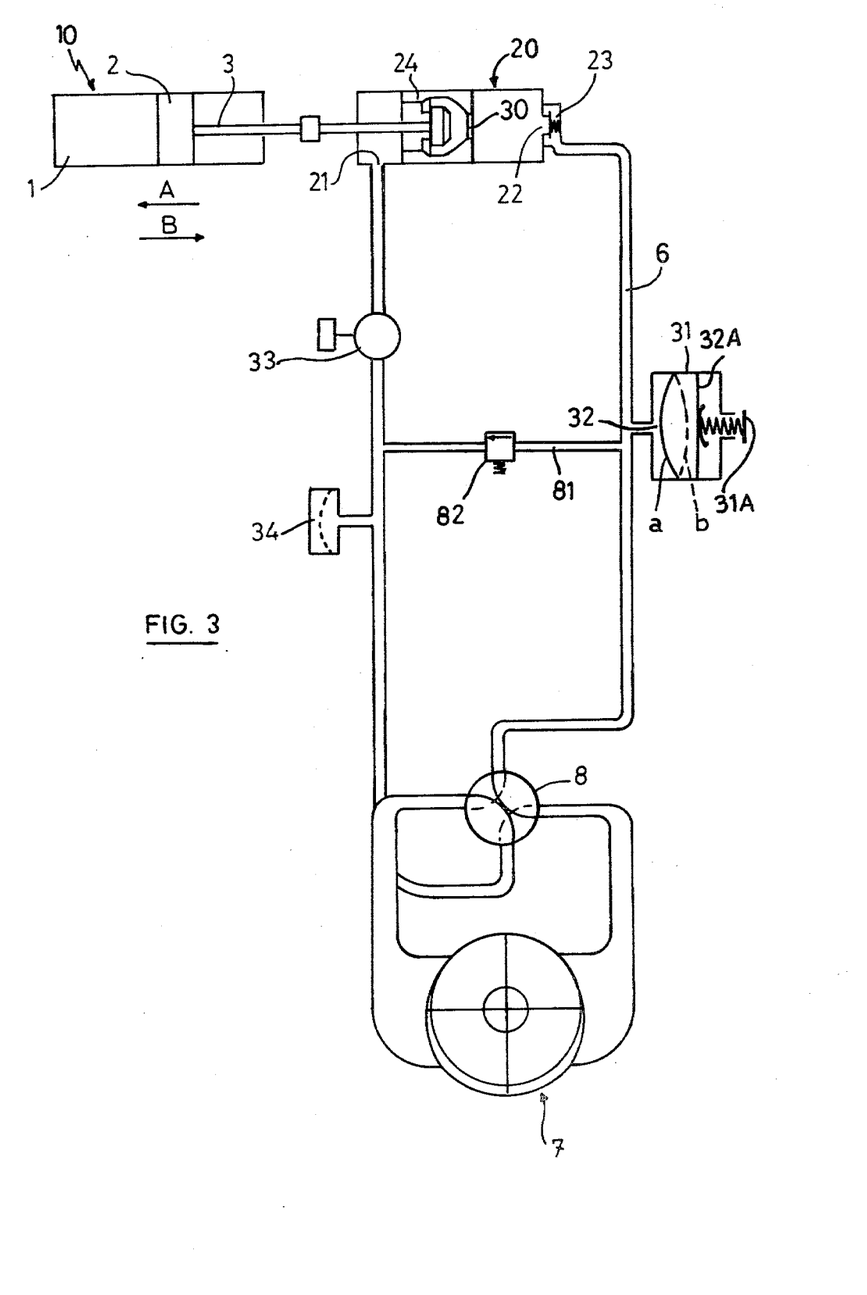
FIG. 3 illustrates diagrammatically the generator of FIG. 1 in combination with automatic regulating hydraulic circuit means.

In the event of a blockage the hydraulic circuit continues to function via the branch pipe 81 provided with a calibrated valve 82.

One important point to be emphasised is that, by virtue of the fluid technology, the changes in operating and running conditions are extremely flexible and smooth, and are very silent.

Figure 4:
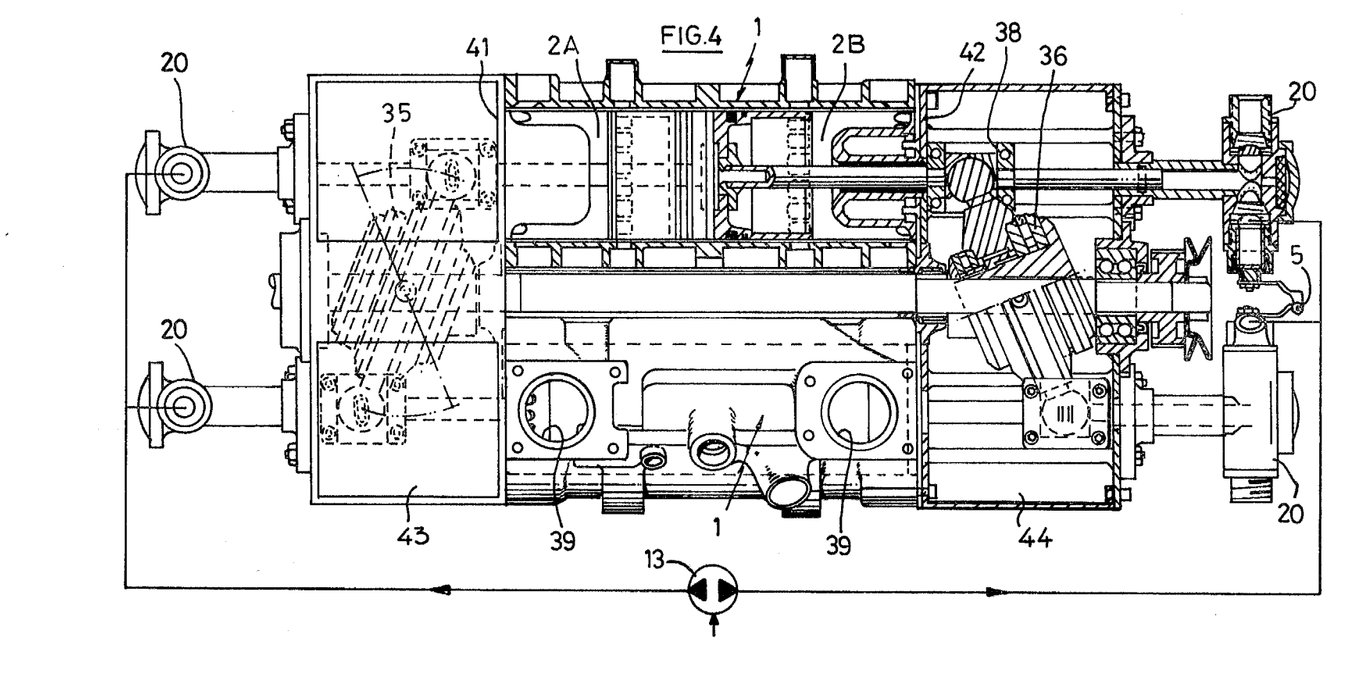
FIG. 4 shows a first embodiment of the generator of the invention.

FIG. 4 shows a first embodiment of the generator of the invention which is suitable as an internal combustion engine. This embodiment comprises four two-stroke engine cylinders, each cylinder containing two opposed pistons. The cylinders 1 are arranged parallel with respect to one another in the manner of a revolver barrel. One of these cylinders is shown in cross-section. The two pistons 2A and 2B can be seen, the first being shown in section. The pistons drive oscillating or swash plates: the piston 2A and the corresponding pistons in the other cylinders drive the oscillating plate 35; the piston 2B and the corresponding pistons in the other cylinders drive the oscillating plate 36. An advantageous aspect of the drive by oscillating plates is that the variation in speed of the pistons in the vicinity of the ends of the stroke takes place in a particularly advantageous manner for both the combustion and scavenging stages. Thus, a longer time is devoted on the one hand to combustion and on the other hand to scavenging. A more complete combustion is thus ensured, thereby resulting in reduced fuel consumption.

Each drive piston 2 is coupled by kinetically rigid connection to a high pressure pump 20. In the embodiment shown in FIG. 4 each pump is comprised by way of example as a conventional pump. The fluid is fed through a flow rate regulating valve 5. On FIG. 4 there is also schematically represented the connection of the forcing pump 13.

A particularly advantageous feature of this embodiment according to the invention is that it provides a kinetically rigid in-line assembly which ensures a remarkably low noise and vibration level together with a great simplicity of construction.

In the example illustrated in FIG. 4, each drive cylinder is hermetically closed at its two ends by walls such as walls 41 and 42. A separate crank-case, common to all the cylinders, is located on each side of the block of cylinders. In FIG. 4, it can be clearly seen that the cylinder 1 is closed at its ends by the partition 41 on the left and the partition 42 on the right. It can also be seen that the crank-case 43 which contains the oscillating plate 35 is separated from the drive cylinders 1. Similarly, the crank-case 44 (on the right of FIG. 4) contains the oscillating plate 36.

The arrangement of crank-cases separated from the cylinder has the considerable advantage that it provides an independent and effective lubricating system for the parts in the crank-cases. The advantage of having adequate lubrication for elements subjected to the effects of heat and elements at low temperature will be appreciated.

On account of the closure of the cylinders 1 at their ends, each of them contains outside its sleeve a transfer duct so as to convey the air from one lower pressure compartment to the other and into the explosion chamber of the cylinder. The connecting ports of the transfer duct for the bottom cylinder can be seen at 39 in FIG. 4.

In this embodiment it can be seen that the ball-and-socket joints coupling the piston rods and the swash plates are mounted in guides 38.

Figure 5:
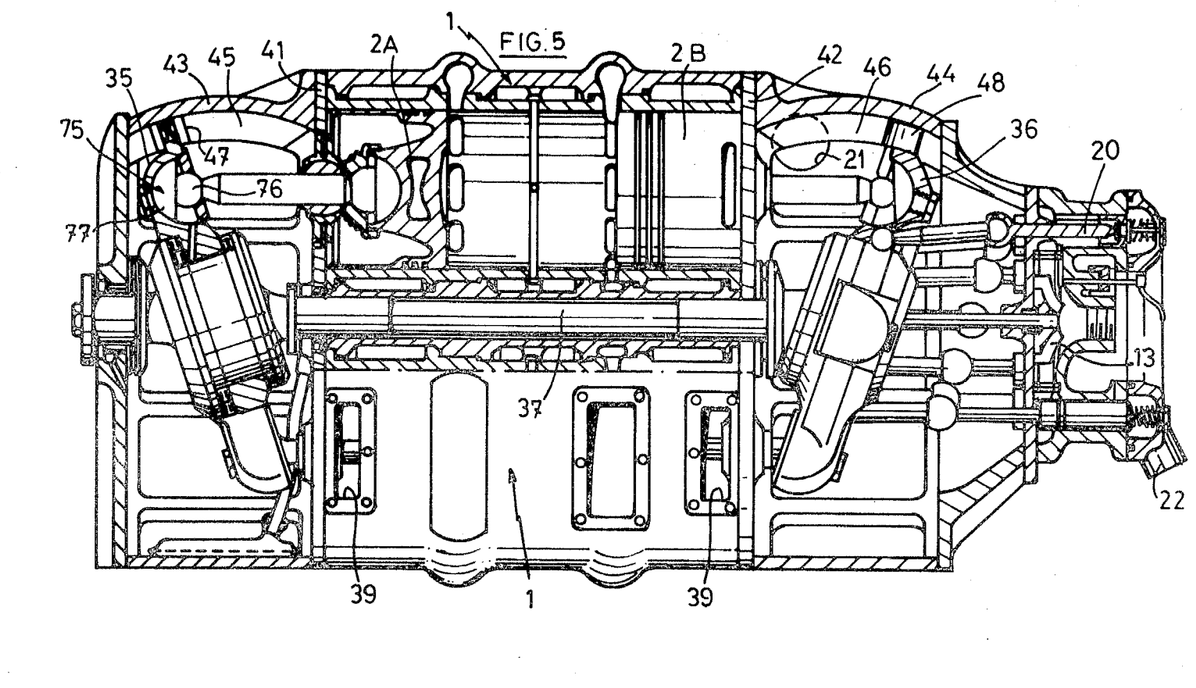
FIG. 5 shows a second embodiment of the generator of the invention.

FIG. 5 illustrates a second embodiment according to the invention. On this Figure the same reference numerals as in FIG. 4 identify the same or equivalent parts and integers. In this embodiment there is provided a sole high pressure pump 20 actuated by the swash plate 36. The latter is coupled to the swash plate 35 via the shaft 37 so as to store on the swash plate 36 all the power of the drive cylinders 1 in order to drive the high pressure pump 20.

In the example shown in FIG. 5, the actuating means of high pressure pump advantageously comprises a plurality of parallel cylinders, supplied by the feed pump 13. The efficiency of the hydrostatic device is thus improved by allowing a higher normal running operation of the engine while reducing the volume of each pump cylinder, thereby allowing advantageously the reduction of the stress level in the moving parts.

The feed fluid coming from the reservoir 4 (FIG. 1) via the flow rate regulating valve 5 is introduced through the tubular opening 21. The outlet 22 of the pump is connected to the hydraulic circuit supplying the working unit 7.

The crank-cases 43 and 44 contain grooves 45 and 46 in which the cam rollers 47 and 48 of the oscillating plates slide so as to maintain the latter and ensure the backward and forward movements of the piston rods of pistons 2A and 2B as well as the rotation of the shaft 37. In order to ensure hermeticity opposite the partitions 41 and 42 while permitting the passage and movement of the piston rods driving the oscillating plates 35 and 36, the piston rods pass through the partitions 41 and 42 in flexible and fluid-tight joints.

Figure 6:
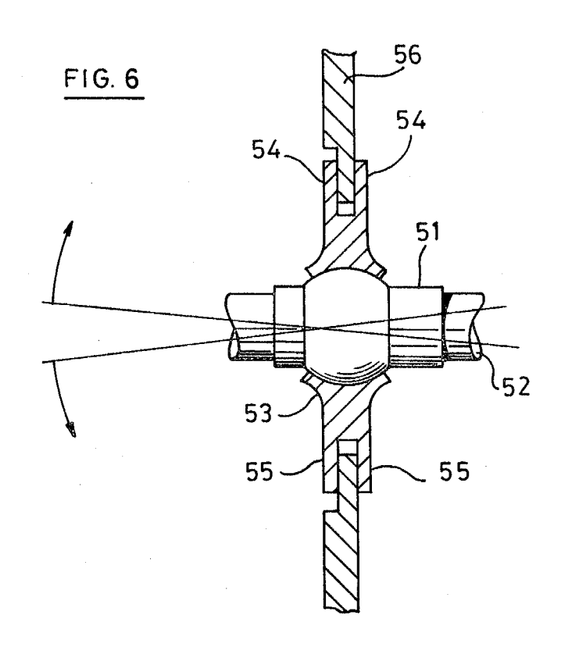
FIGS. 6 and 7 illustrate two embodiments of joints as used in the assembly of FIG. 5.
Figure 7:
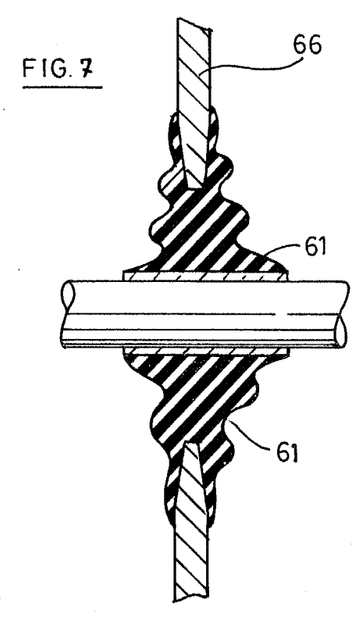

One example of embodiment is shown in section in FIG. 6. It comprises a body 51 having a substantially spherical central part with a passage for the piston rod 52 and a collar 53 surrounding the spherical part of the body 51 so as to allow this spherical part to move in the cavity of the collar 53. The collar has two pairs of parallel flange portions 54 and 55 practically perpendicular to the longitudinal axis of the body 51, these pairs of flange portions serving to confine the partition 56 with a sufficient degree of radial clearance. FIG. 7 illustrates another embodiment. In this case, the body 61 is of a flexible and fluid-tight material with flanges to confine the partition 66 with a sufficient degree of radial clearance.

Figure 8:
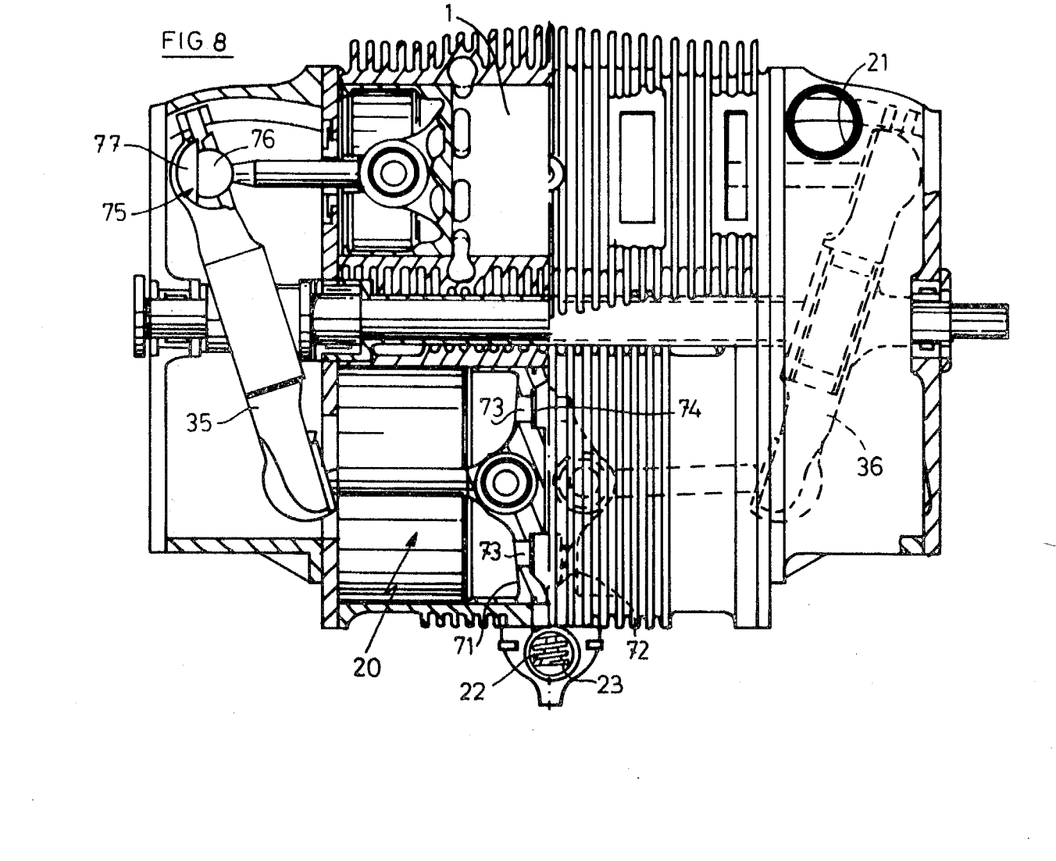
FIG. 8 shows a third embodiment of the generator of the invention.

FIG. 8 illustrates another embodiment of engine assembly according to the invention.

This embodiment comprises a two-stroke engine cylinder 1 containing two opposed pistons and an air compressor equivalent to the high pressure pump 20 of FIG. 5 but containing only one large volume cylinder. The air compressor comprises two opposed pistons 71 and 72 coupled respectively to the oscillating plates 35 and 36. The air outlet orifice 22 is provided with a valve 23. The pistons 71 and 72 consist of a body provided with axial openings 73 and a washer 74 mounted with a degree of axial clearance so as to act as a valve. The openings 73 are closed by the washer 74 when the pistons move toward one another. The air contained between the two pistons is thus compressed and forced through the valve 23. When the pistons 71 and 72 move apart, the air admitted into the cylinder passes through the openings 73, which releases at this moment the washer 74, the air then filling the chamber between the two pistons.

In this embodiment the hydrostatic circuit of FIG. 1 is adapted to form a pneumatic circuit.

In this embodiment the continuous lubrication of the mechanical parts is ensured by atomising a sufficient amount of oil in the inlet air. This feature has the advantage of ensuring a suitable lubrication and an excellent hermeticity of the working unit.

Figure 9:
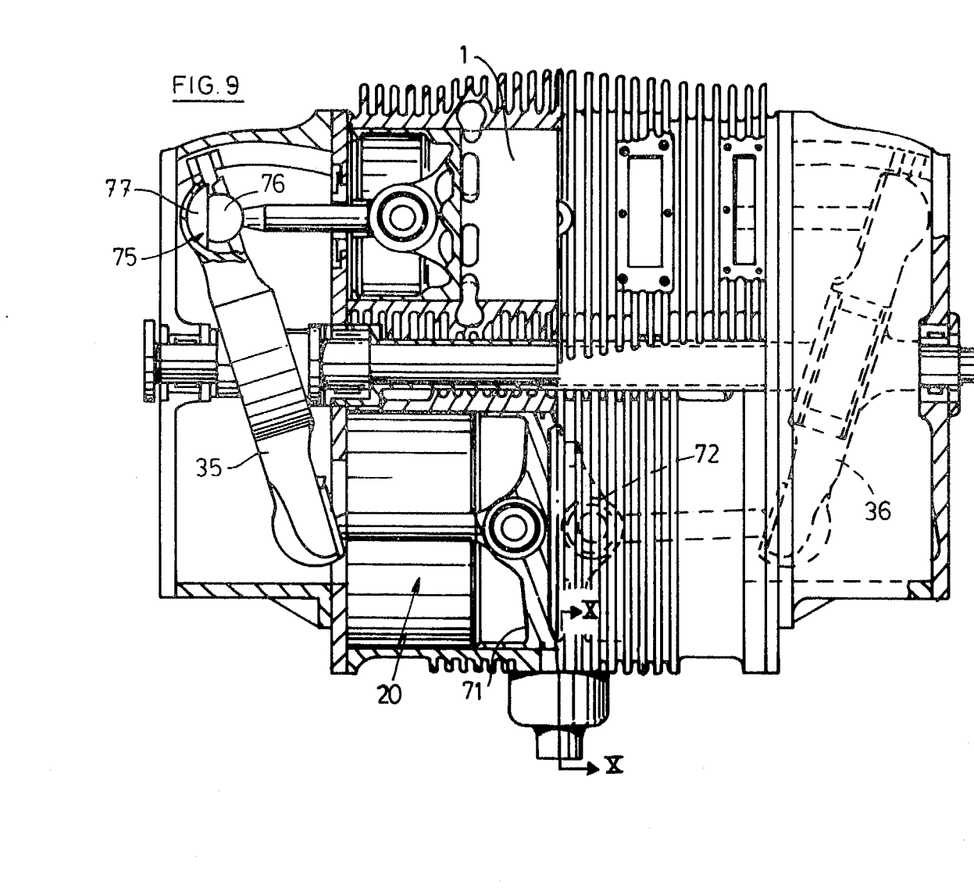
FIG. 9 shows a variation of the embodiment of FIG. 8.
Figure 10:
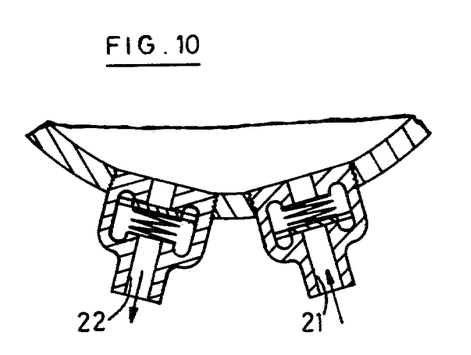
FIG. 10 is a sectional view along line X—X in FIG. 9.

FIGS. 9 and 10 illustrate a modification of the embodiment of FIG. 8. This variant differs substantially from the embodiment illustrated in FIG. 8 only by the fact that the pistons 71 and 72 of the air compressor are not provided with axial openings. This embodiment advantageously serves as a compact motor compressor enjoying all the beneficial features of the generator according to the invention.

The advantageous form of the ball-and-socket coupling for the piston rods, such as the ball-and-socket joint 75, will be noted in FIGS. 5,8,9. The ball-and-socket joint comprises two parts, namely a first part 76 connected to the piston rod, and a second part 77 having a contact and thrust surface of radius of curvature greater than the radius of curvature of the part 76, against which is exerted a weaker tractive force.

What is claimed is:

1. Power generator comprising:
   (a) body means having three chambers separated from each other by fixed fluid-tight partitions and having a central bore,
   (b) shaft means rotatably mounted in the central bore of said body means with at least one end of said shaft means extending from the body means,
   (c) at least two drive cylinders mounted in the central one of the chambers in said body means, each of said drive cylinders including two pistons slidably mounted in opposition with each piston having two opposite working faces, the piston rods attached to the corresponding ones of said pistons traversing a respective of said partitions through stationary fluid-tight joints for allowing the piston rods to move therethrough on a pure translational movement, and
   (d) two swash plate means, each one being included in a respective lateral one of said chambers, each of said swash plate means being attached to the shaft means and having means for mechanical attachment of the piston rods from the corresponding pistons in said drive cylinders.

2. A power generator according to claim 1, wherein each of said joints comprises a body having a substantially spherical central part with a passage for a piston rod, and a collar surrounding said spherical central part so as to allow the latter to move in the collar cavity, said collar having two pairs of parallel flange portions substantially perpendicular to the longitudinal axis of the body, and said pairs of flange portions serving to confine a partition with a degree of radial clearance.

3. A power generator according to claim 1, wherein each of said joints comprises a body of flexible and fluid-tight material having at least one passage provided with a sleeve made of a friction-resistant material and having flanges serving to confine a partition with a degree of radial clearance.

4. A power generator according to claim 1, wherein said means for mechanical attachment of a piston rod to a swash plate means comprises a ball-and-socket joint having two contact and thrust surfaces of different radii of curvature.

5. A power generator according to any of claims 1 to 4, wherein at least one of said swash plate means further has means for mechanical attachment of at least one piston rod of a high pressure fluid pump.

* * * * *